United States Patent [19]

Mueller

[11] 3,876,729

[45] Apr. 8, 1975

[54] GRAFT COPOLYMERS OF A BACKBONE POLMER AND A PERFLUOROALKYL GROUP CONTAINING MONOMER DERIVED FROM FUMARIC AND RELATED ACIDS

[75] Inventor: Karl Friedrich Mueller, New York, N.Y.

[73] Assignee: Ciba-Geigy Corporation, Ardsley, N.Y.

[22] Filed: Feb. 20, 1973

[21] Appl. No.: 334,166

Related U.S. Application Data

[63] Continuation of Ser. No. 139,973, May 3, 1971, abandoned.

[52] U.S. Cl. ............................................ 260/878 R
[51] Int. Cl. ............................................ C08f 15/02
[58] Field of Search ............................... 260/878 R

[56] References Cited
UNITED STATES PATENTS

| | | | |
|---|---|---|---|
| 3,068,187 | 12/1962 | Bolstad et al. | 260/878 |
| 3,252,932 | 5/1966 | Bolstad et al. | 260/878 |
| 3,594,353 | 7/1971 | Domba | 260/78.4 |

*Primary Examiner*—Harry Wong, Jr.
*Assistant Examiner*—A. Holler
*Attorney, Agent, or Firm*—Joseph G. Kolodny; Edward McC. Roberts; Prabodh I. Almaula

[57] ABSTRACT

A graft copolymer of a backbone polymer to which is grafted a fluorinated unsaturated monomer compound of the formula $(R_f—A)_n$—PG wherein $n$ is an integer of 2 or 3, $R_f$ is a perfluoroalkyl group, preferably of at least 3 carbon atoms, A is a linking group, and PG is a polymerizable group derived from fumaric and related acids, which reluctantly homopolymerizes in the presence of free radical generating initiators. Such graft copolymers have very low free surface energies especially when compared to the ungrafted backbone polymer. Other physical state properties of the graft copolymer compared with the ungrafted backbone polymer are essentially the same. The graft copolymers are obtained by mixing together from 0.01 to about 30 percent by weight of the fluoro monomer defined with the backbone polymer at or above the melting temperature of the backbone polymer, preferably in the presence of a free radical generating initiator for from a few seconds to about twenty minutes.

Preferred embodiments are ethylene-propylene terpolymers or polyethylene, to which is grafted a bis(1,1,2,2-tetrahydroperfluoroalkyl) fumarate.

3 Claims, No Drawings

GRAFT COPOLYMERS OF A BACKBONE POLMER AND A PERFLUOROALKYL GROUP CONTAINING MONOMER DERIVED FROM FUMARIC AND RELATED ACIDS

This application is a continuation of Ser. No. 139,973, filed on May 3, 1971, now abandoned.

BACKGROUND OF THE INVENTION

1. Field of the Invention;

This invention relates to graft copolymers of normally solid polymers and fluorinated monomer compounds of fumaric acid and related acids. The grafted copolymers of the present invention have much lower free surface energies than the corresponding ungrafted polymers, however, most of the other solid state properties of the graft copolymers are the same as those of the ungrafted polymers.

2. Description of the Prior Art

Polymeric fluorinated organic compounds have been used widely in the past to provide soil repellent finishes for a variety of substrates. Compositions of perfluorinated organic compounds have found wide uses in oil and water repellent finishes especially for textile materials. Such compounds have been applied to textiles and other substrates from aqueous and solvent solution systems. Such applications generally require special equipment and a separate step in the processing of the finished textiles. Most applications in the past have required the use of expensive fluorinated solvents such as trifluorotoluene and 1,1,2-trifluoro-1,1,2-trichloroethane.

In addition, while the performance of such finishes as soil repellents has generally been quite satisfactory, their overall utility has often been less than satisfactory due to lack of fastness in regard to abrasion, washing, and dry-cleaning. The abrasion factor has particularly limited the utilization of such finishes in important areas such as carpets.

Typically a fabric or substrate which has been treated with a perfluorinated polymer composition might initially exhibit very satisfactory or excellent oil and water repellent properties, but after a short period of utilization and/or subsequent to being treated by some cleaning process, the repellent finish has largely lost its effectiveness due to poor adherence to the substrate.

In U.S. Pat. No. 3,267,173, it is disclosed that many of the physical properties of polyethylene may be modified by forming a graft copolymer of the polyethylene polymer with a monomeric maleic acid diester which is present in the graft copolymer in amounts of from 0.5 to about 12 percent by weight. Such graft copolymers are alleged to yield a more flexible and readily extendable polymer then the unmodified polyethylene, and one which has improved notched impact brittleness temperature, resistance to environmental stress cracking, and improved clarity. The graft copolymers are formed by heating the composition comprising the polyethylene polymer and from 0.5 to about 30 percent by weight of the maleic acid diester of the formula:

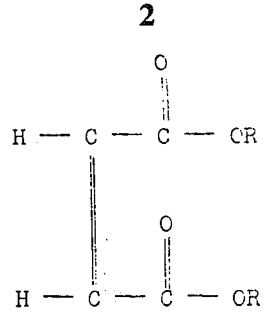

wherein each R is an organic radical, at a temperature at or above the melting point of the polyethylene polymer in the presence of at least 0.20 percent of a hydroperoxide having half-life at at least 1 minute at 145°C.

U.S. Pat. No. 3,166,607 discloses a method of improving the dyeability of isotactic polypropylene by heating it at a temperature at or above its melting point in the presence of a polymerizable monomer which is a derivative of an unsaturated carboxylic acid containing a small number of carbon atoms such as maleic, fumaric and acrylic acids, and derivatives thereof such as esters, halides, amides, and nitriles. The mixture is melted and extruded to form shaped articles such as filaments and the like. Preferably the peroxide or hydroperoxide groups are added to the mixture to induce formation of free radicals.

SUMMARY OF THE INVENTION

One of the principal objects of this invention is to provide a graft copolymer of (A) a backbone polymer, and (B) a monomer compound having a perfluorinated alkyl group therein, and containing ethylenic unsaturation derived from a polybasic acid such as fumaric acid and related acids, which graft copolymer has a much lower free surface energy than the corresponding ungrafted polymer. The graft copolymers of the present invention contain from about 0.01 to 30 percent by weight of the perfluoroalkyl group containing compound derived from the polybasic acid such as fumaric acid and the like.

Because of the dramatic decrease in the free surface energy of the graft copolymer compared to the ungrafted polymer, graft copolymers of this invention find application in finishes requiring oil and water repellent characteristics on a substrate. Since the perfluorinated alkyl containing segment is directly incorporated as part of the substrate, the durability of the "soil resistant finish" is outstanding since it, in fact, extends throughout the substrate.

In addition, the graft copolymers of the present invention are particularly useful wherever a polymer having low free surface energy is desired. By way of illustration, a polyethylene graft copolymer according to the present invention is especially useful in applications where polytetrafluoroethylene polymers are presently employed because of their low free surface energy characteristics.

One of the primary advantages of the graft copolymers of the present invention is that aside from the lowering of the free surface energy of the resulting graft copolymer, the other physical characteristics of the ungrafted polymer are either unchanged or changed to negligible degrees by the grafting of the monomeric perfluoroalkyl containing compound to the polymer backbone.

Graft copolymers of the present invention are obtained by mixing together a polymer together with the fluorinated unsaturated compound of the formula:

$$(R_f—A)_n—PG$$

and heating the resulting mixture at a temperature at or above the melting point of the polymer, with mechanical agitation of the mixture, preferably in the presence of a free radical generating initiator, and thereafter recovering the resulting graft copolymer. In the above formula, $R_f$ is a perfluorinated organic alkyl group, A is a linking group, n is an integer of 2 to 3, and —PG is an ethylenically unsaturated group. The $(R_f—A)_n$—PG compound which contains the perfluorinated organic alkyl group is one which only very reluctantly homopolymerizes. The —PG group, which is an ethylenically unsaturated group, is derived from a polybasic acid selected from fumaric acid, maleic acid, mesaconic acid, citraconic acid, itaconic acid, transaconitic acid, cis-aconitic acid, and methylene malonic acid.

The specific class of fluorinated monomer compounds employed in this invention are ones which do not readily homopolymerize. Because of this, the graft copolymer is one with short "fluorinated side chains" attached thereto, and possesses a high degree of homogeneity having a very low free surface energy in relation to the relatively small amounts of fluorinated monomer used. This is in contrast to the case where a graft copolymer of a fluoroalkyl methacrylate, for instance, which homopolymerizes very rapidly to produce homopolymer and graft copolymers with relatively few but long fluorinated side chains which are more heterogeneous and do not lower the free surface energy to the same degree as the fluorinated monomer compounds specified for grafting according to this invention.

By using the specific fluorinated monomer compounds defined according to this invention, there are generally two closely packed "perfluorinated tails" present for every unsaturated bond and thus a much better degree of repellency and lowering of the free surface energy of the graft polymers obtained for every monomeric unit which is grafted onto the polymer backbone.

An additional advantage obtained by utilizing the specific class of monomeric fluorinated compounds is that they have about double the molecular weight in contrast to the corresponding methacrylate compounds. They are thus less volatile at the processing temperatures utilized to graft the monomer to the polymer backbone.

The graft copolymers of this invention are made by mixing together the thermoplastic polymer, generally in powder or small chip form, with from about 0.01 to about 30 percent by weight of the fluorinated monomer compound defined above, heating the mixture at or above the melting temperature of the polymer, subjecting the melted mixture to mechanical mixing which mixing induces mechanical rupture of the backbone polymer molecule, preferably in the presence of about 0.01 to about 3 percent by weight of a free radical generating initiator. The temperatures employed should not exceed those at which the decomposition of either the monomeric compound or the backbone polymer is significant. The temperatures at which the process is carried out are generally between 100°C and 270°C. The graft copolymer according to the present invention has from 0.01 to about 30 percent by weight of the fluoro monomer compound grafted to the backbone polymer. The preferred amount of grafted monomer is from about 0.1 to about 10 percent with 1 to 5 percent most preferred.

The mechanism or mechanisms by which the fluoro monomer grafts to the polymer backbone in the above process is not fully understood but is induced by a combination of heating and formation of free radicals from the heating, the presence of the free radical generating initiator, the mechanical rupture of the backbone polymer molecules in the mixing apparatus, and the presence of residual unsaturation in the backbone polymer. All provide means for the fluoro monomer to graft to the polymer backbone.

DESCRIPTION OF THE PREFERRED EMBODIMENTS

As indicated, the graft copolymer of the present invention comprises a polymer backbone to which is grafted from about 0.01 to 30 percent by weight of a fluoro monomer of the formula $(R_f—A)_n$—PG. Preferably the graft copolymer contains approximately 0.50 to about 10 percent by weight of the grafted fluoro monomer, most preferably from about 1 to about 5 percent by weight of the grafted fluoro monomer.

The backbone polymer is preferably in a powdered or small chip form and is mixed with from about 0.01 to about 30 percent by weight of the compound of the formula $(R_f—A)_n$—PG. The mixture is heated to at or above the melting or processing temperature of the thermoplastic polymer. The mixture is maintained at this temperature and subjected to mechanical mixing for a period of time sufficient to obtain a satisfactory degree of grafting efficiency.

As indicated, it is preferred that from 0.01 to about 3 percent by weight of a free radical generating initiator be employed. Preferably about 0.2 to 1 percent by weight of initiators such as the peroxides set forth below is employed.

Generally the time required to achieve a satisfactory grafting efficiency ranges from a few seconds to about twenty minutes.

As indicated, the mixing procedure will induce a mechanical shearing or rupture of the backbone polymer compound and improves the grafting efficiency significantly.

The grafted copolymer can be recovered in any form usual for polymers suxh as extruded filaments, molded solids, or pressed films and the like. Such techniques are all routine in the art. The graft copolymer can be generally processed in the same manner as the particular backbone polymer which is employed.

As previously indicated, one of the outstanding advantages of the graft copolymers of the present invention is the lowering of the free surface energy compared to the ungrafted polymer while the other solid state properties remain unchanged which is unique to these graft copolymers.

The specific types of unsaturated compounds containing fluorinated alkyl groups which may be utilized in the practice of this invention are as follows:

Compounds of the formula:

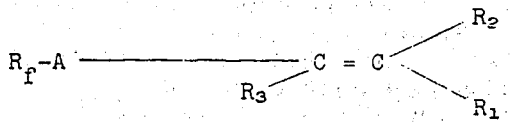

wherein $R_1$ and $R_2$ are (a) hydrogen, (b) methyl, or (c) $R_f$—A— and $R_3$ is (a) hydrogen; (c) $R_f$—A—; or (d) $R_f$—A—$CH_2$—; at least one of $R_1$, $R_2$, and $R_3$ being $R_f$—A— or $R_f$—A—$CH_2$—, at least one of $R_1$, $R_2$, and $R_3$ being hydrogen or methyl, wherein $R_f$ is a perfluorinated alkyl group, and A is a linking group. Thus, there are formed fumarates, maleates, methylene malonates, mesaconates, citraconates, itaconates, transaconitates, cisaconitates.

In the foregoing formula $R_f$—A— may for example be

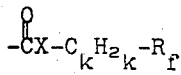

wherein $k$ is 0 to 10, and X is oxygen, or sulfur;

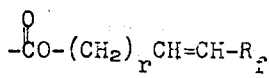

wherein $r$ is 1 to 10;

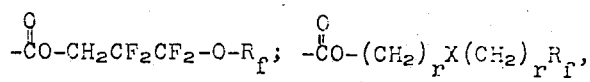

wherein $r$ is 1 to 10; and X is oxygen or sulfur;

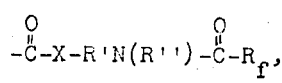

wherein R' is alkylene of 2 to 6 carbons, R'' is hydrogen or alkyl of 1 to 4 carbon atoms, and X is oxygen, or sulfur;

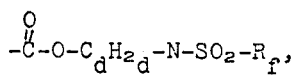

wherein D is 2 to 11, R is alkyl or 1 to 4 carbons, and wherein $R_f$ in each case is —$C_mF_{2+}$ wherein m is 3 to 14; and the compound of the formulae:

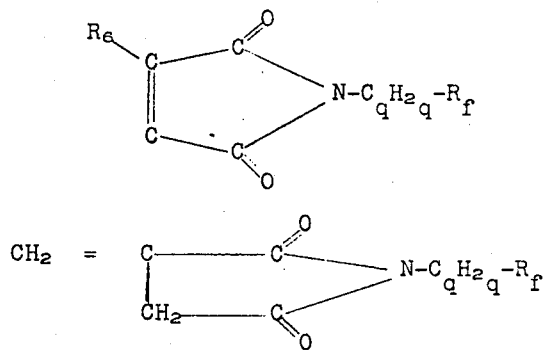

wherein $R_6$ is hydrogen or methyl; q is 1 or 2; and $R_f$ is as defined above.

$R_f$-unsaturated compounds of the foregoing type especially useful in the practice of this invention are described in the following co-pending applications assigned to the assignee of the present invention Ser. No. 720,370, filed Apr. 10, 1968, in the names of Eduard K. Kleiner and Martin Knell; Ser. No. 732,040, filed May 27, 1968, in the names of Eduard K. Kleiner, Martin Knell and Pier Luigi Pacini; Ser. No. 812,439, filed Apr. 1, 1969, in the name of Eduard K. Kleiner; Ser. No. 820,647, filed Apr. 30, 1969, in the name of Eduard K. Kleiner; and Ser. No. 833,706, filed June 16, 1969, in the names of Eduard K. Kleiner and Pier Luigi Pacini.

The $R_f$-group of the $R_f$ compound preferably has at least three carbon atoms, i.e., $C_mF_{2+}$ wherein $m$ is equal or greater than 3. The value of the integer $m$ desirably ranges from 3 to 14, and preferably is about 6 to 12, with an average length of 8 carbons preferred in most instances.

It is to be understood that the perfluoroalkyl group may be a mixture of varying chain length. Basic starting materials are often obtained by telomerization procedures yielding $C_mF_{2+}$ groups of varying length.

A generally preferred type of fluorinated unsaturated compound utilized in the practice of this invention is that in which $R_f$—A— is

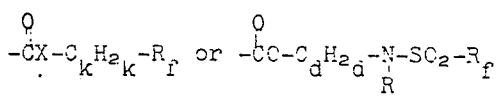

wherein X, k, d, R and $R_f$ are as defined above. The former type is especially preferred. Most preferred are bis-(1,1,2,2-tetrahydroperfluoralkyl) fumarates.

All polymers which exhibit thermoplastic properties at temperatures in the range of about 75°C to about 350°C, preferably 125°C to 250°C, and which have hydrogen atoms in their backbone can be used as graftsites for the synthesis of the graft copolymers of this invention.

Examples of suitable thermoplastic polymers are those derived from vinyl monomers and related compounds. Among the most useful polymers and copolymers of this type are: high-and low-density polyethylene, including copolymers of ethylene and with propylene, butene-1, butene-2, 3-methyl-butene-1, pentene-1, Hexene-1, 1,3-butadiene, vinyl acetate, vinylchloride, and ethylene-propylene terpolymers.

Also especially useful are high molecular weight polyisobutylene and isobutylene-isoprene copolymers; polypropylene, and copolymers of propylene; polymers of butadiene and isoprene and copolymers thereof with styrene; acrylonitrile, methacrylic acid and vinyl pyridine; polymers of chloroprene and copopolymers thereof with styrene, butadiene, isoprene and acrylonitrile; styrene polymers, including copolymers with methyl methacrylate, acrylonitrile, vinyl carbazole and isobutylene; polymers and copolymers of vinyl fluoride, vinylidene fluoride, vinyl chloride, vinylidene chloride, acrylonitrile and methacrylonitrile; vinylesters, such as homo- and copolymers of vinyl acetate, vinyl propionate, vinyl benzoate, isopropenyl acetate; and homo- and copolymers of methyl vinyl ether, ethyl vinyl ether, butyl- and isobutyl vinyl ether and higher homologs, and copolymers with esters of fumaric, maleic and itaconic acid; and homo- and copolymers of esters and amides or acrylic and methacrylic acid, such as methyl methacrylate, ethyl-, propyl-, butyl, hexyl, 2-ethylhexyl acrylate and methacrylate; and polymers of vinyl pyrrolidone, vinyl pyridine and N-vinyl carbazole.

Other thermoplastic polymers are polycondensation products, such as polyesters and polyamides. The polyamides are characterized by recurring amido radicals as an integral part of the polymer chain. The amido radicals are linked by divalent organic radicals which may be aliphatic, cycloaliphatic or aromatic, or mixtures of the above. Typical polyamides are poly(hexamethylene adipamide) ("66" nylon), polycaprolactam, poly(hexamethylene sebacamide), polyaminoundecanoamide, poly(hexamethylene isophthalamide), poly(2-methyl hexamethylene terephthalamide), poly(meta-xylylene adipamide), poly(para-xylene sebacamide), poly(octamethylene oxalamide), and the polyamide from bis(4-aminocyclohexyl) methane and aliphatic acids such as dodocanediopic acid. Copolymers having two or more components, as well as polymer and copolymer mixtures of the above are also included.

Linear polyesters containing carbonyloxy linking radicals

are very useful.

Polymers containing oxycarbonyloxy radicals are comprehended within this group. The polymers should be of fiber-forming molecular weight; usually, this implies a relative viscosity of about 10 or higher as conventionally measured in solution in a solvent for the polymers. Copolyesters, terpolyesters, and the like intended to be comprehended within the term "polyesters".

Examples of crystallizable, linear condensation polyesters include polyethylene terephthalate, polyethylene terephthalate/isophthalate (85/15), polyethylene terephthalate/5-(sodium sulfo)isophthalate (97/3), poly(p-hexahydroxylylene terephthalate), polyhydroxypivalic acid, poly(decahydronaphthalene-2,6-dimethylene 4,4'-bibenzoate), polyethylene 2,6- or 2,7- naphthalenedicarboxylate, and poly(bicyclohexyl-4,4'-dimethylene-4,4'-bibenzoate), as well as many others. Preferably, the polyester is a linear glycol and terephthalate polyester. By this is meant a linear condensation polyester derived from a glycol and an organic acid in which the glycol component is comprised substantially of a dihydroxy compound of a divalent saturated hydrocarbon radical containing from 2 to 10 carbon atoms and the acid component is at least about 75 mol percent terephthalic acid.

Other polymers useful as backbone polymers are polycarbonates, polymethylene oxides, polyethylene oxide, polyphenylene oxides, urethane elastomers; cellulose acetate, butyrate, propionate, and ethyl cellulose.

Preferred among the backbone polymers are polyethylene, polypropylene, and ethylene/propylene diene terpolymers.

As indicated, it is preferred to employ a free radical initiator to accomplish the grafting within the shortest possible time. Generally, peroxide initiators are preferred. Among the general classes of peroxide initiators which may be used are aliphatic diacyl peroxides, aromatic diacyl peroxides, dibasic acid peroxides, ketone peroxides, alkyl peroxyesters, alkyl peroxides, and alkyl hydroperoxides.

Specific examples of the most commonly used peroxides of the types mentioned are listed in T. Brandrup and E. H. Immergut, Polymer Handbook, p. II-15 to II-51, 1965 (John Wiley and Sons, N.Y.) and in Houben-Weyl, Methoden der Organischen Chemie, Vol. XIV/1, p. 231–247, 1961 (Georg Thieine Verlong, Stuttgart).

Preferred grafting temperatures are identical with the processing temperatures of the polymers employed as the graftsites, i.e., generally at or above the softening point of the polymer.

Some of the most important and commercially available peroxides and their half-life times at different temperatures are shown in the following table.

| Peroxide* | 100°C | | 130°C | | 145°C | | 160°C | | 175°C | | 190°C | |
|---|---|---|---|---|---|---|---|---|---|---|---|---|
| Aromatic diacyl peroxides | | | | | | | | | | | | |
| Benzoyl peroxide | 24 | min. | — | | — | | — | | — | | — | |
| p-chlorobenzoyl peroxide | 30 | min. | — | | — | | — | | — | | — | |
| Aliphatic diacyl peroxides | | | | | | | | | | | | |
| Lauroyl peroxide | 5.4 | min. | — | | — | | — | | — | | — | |
| Pelargonyl peroxide | 5.4 | min. | — | | — | | — | | — | | — | |
| Decanoyl peroxide | 5.4 | min. | — | | — | | — | | — | | — | |
| Acetyl peroxide | 12 | min. | — | | — | | — | | — | | — | |
| Propionyl peroxide | 7.8 | min. | — | | — | | — | | — | | — | |
| Dibasic acid peroxides | | | | | | | | | | | | |
| Succinic acid peroxide | 24 | min. | — | | — | | — | | — | | — | |
| Ketone peroxides | | | | | | | | | | | | |
| Cyclohexanone peroxide | 3.8 | hrs. | 24 | min. | — | | — | | — | | — | |
| Alkylperoxyesters | | | | | | | | | | | | |
| t-Butyl peroxyisobutyrate 33 | min. | — | — | | — | | — | | — | | — | |
| Di-t-butyl diperphthalate | 17.8 | hrs. | 30 | min. | 5.4 | min. | — | | — | | — | |
| t-Butyl perbenzoate | 18 | hrs. | 33 | min. | 6 | min. | 1.55 | min. | — | | — | |
| 2,5-dimethylhexane-2,5- diperoxybenzoate | 10 | hrs. | 16.2 | min. | 2 | min. | — | | — | | — | |
| t-Butyl peroxymaleic acid | 2.8 | hrs. | 12 | min. | — | | — | | — | | — | |
| Alkyl peroxides | | | | | | | | | | | | |
| Di-t-butyl peroxide | — | | 6.4 | hrs. | 1.4 | hrs. | 19.8 | hrs. | 5.16 | hrs. | 1.5 | min. |
| 2,5-dimethyl-2,5-di(t-butylperoxy) hexane | — | | 2.8 | hrs. | 24.3 | hrs. | 4.8 | min. | 0.98 | min. | 0.24 | min. |
| 2,5-dimethyl-2,5-di(t-butylperoxy) hexyne-3 | — | | 8.2 | hrs. | 1.69 | hrs. | 18.7 | min. | 4.08 | min. | 1.04 | min. |
| Alkyl hydroperoxides | | | | | | | | | | | | |
| t-butyl hydroperoxide | — | | — | | 114 | hrs. | 24 | hrs. | — | | — | |
| 2,5-dimethylhexane-2,5-dihydroperoxide | — | | 120 | hrs. | 29 | hrs. | 5.5 | hrs. | — | | — | |
| Alpha-cumyl hydroperoxide | — | | — | | 29 | hrs. | 9 | hrs. | — | | — | |

*All listed peroxides are commercially available and are sold by the LUCIDOL DIVISION, Wallace and Tiernan, Inc.

The choice of peroxides is dependent on grafting temperature and grafting time. It is desirable to select a peroxide which decomposes as much as possible during the grafting cycle since residual peroxide in the graftpolymer may create problems, such as slow degradation of the polymer by oxidation processes. Furthermore, the selected peroxides should have low volability at grafting temperatures so that loss of peroxides is kept at a minimum.

While the grafting also can be achieved in the absence of peroxides, especially at very high grafting temperatures and/or high shearing forces, the grafting times required are generally much longer in such instances so that it is advisable to use peroxides if possible.

The amount of peroxide employed for the grafting reaction can vary significantly but generally 0.01 to 3 percent by weight of peroxide based on the graftsite polymer is employed and preferably from about 0.2 to about 1 percent by weight.

The following examples describing certain representative embodiments of this invention will serve to further illustrate the nature of this invention. It is to be understood that the examples are merely illustrative, and intended to enable those skilled in the art to practice the invention in all of the embodiments flowing therefrom and do not in anyway limit the scope of the invention defined in the claims. Unless otherwise specified, the relationship of parts by weight to parts by volume is that of grams to cubic centimeters, and temperatures are degrees Centigrade.

Bis(1,1,2,2-tetrahydroperfluoroalkyl) fumarate referred to in the examples is a mixture which may be prepared by the telomerization of perfluoroalkyliodide with ethylene and the reaction of the telomer with fumaric acid in the presence of triethylamine to yield the desired diester described in copending application Ser. No. 829,764, filed June 2, 1969 in the names of Martin Knell and Edward Berger and assigned to the same assignee as the present application, or by other methods such as converting the telomer iodide to the corresponding alcohol and esterifying directly with fumaryl chloride are known to those skilled in the art.

The mixed bis(1,1,2,2-tetrahydroperfluoroalkyl) fumarate employed in the examples is an off-white wax in appearance and the $R_f$ group of the diesters had the following composition:

| | |
|---|---|
| $C_6F_{13}$ | 17.4% |
| $C_8F_{17}$ | 71.5% |
| $C_{10}F_{21}$ | 9.9% |
| $C_{12}F_{25}$ | 0.7% |

EXAMPLE 1

Grafting of Bis(1,1,2,2-Tetrahydroperfluoroalkyl) Fumarate Monomer on High Density Polyethylene 38 g of high density polyethylene (HiFax 4401 from Hercules) and 2 g of bis(1,1,2,2-tetrahydroperfluoroalkyl) fumarate are mixed and filled into a C. W. Brabender Plasti-Corder[1]) kept at 160°C. After the polyethylene $R_f$-fumarate mixture becomes molten, 0.2g of dicumyl peroxide are added and the mixture is sheared at 160°C and a rotor speed of 60 RPM for 10 minutes. The resulting graftpolymer is pressed into films and has a milky white appearance. One gram of the graftpolymer is pulverized after cooling in liquid nitrogen and submitted to a 16 hour acetone extraction in a Soxhlet-apparatus to remove ungrafted fumarate monomer. The grafting efficiency is calculated as follows:

Fluorine Analysis:

Fluorine found in bis(1,1,2,2-tetrahydroperfluoroalkyl) fumarate: 64.05 percent.

Fluorine calculated for graftpolymer containing 5 percent of bis(1,1,2,2-tetrahydroperfluoroalkyl) fumarate (100 percent graft-efficiency): 3.2 percent.

Fluorine found in graftpolymer after acetone extraction: 3.0 percent.

Grafting efficiency: 94 percent.

[1]) Trademark of the torque rheometer manufactured by C. W. Brabender Instruments, Inc., South Hackensack, N.J., or: Plastograph (similar instrument manufactured by the affiliated Company, Brabender OHG, Duisburg, W. Germany.

The physical properties of the purified crude graftpolymer compared to ungrafted polyethylene wee determined as described below and the results are listed in Table 1.

These results show significantly that: (a) the free surface energy for the pure and crude graftpolymer is 15.6 dynes/cm ($\delta$ C), whereas ungrafted high density polyethylene has a $\delta$c of 31 dynes/cm; (b) the flow properties are improved (see melt viscosity); and (c) the other physical properties are almost unchanged compared with ungrafted polyethylene treated in the Brabender Plasticorder the same way in the absence of $R_f$-fumarate monomer.

TABLE 1[2])

| Physical Properties | Graftpolymer Example 1 | Ungrafted Polyethylene |
|---|---|---|
| Critical free surface energy, ($\delta$ c), dynes/cm | 15.6 | 31 |
| Apparent viscosity, poise, 190°C | 7.59 × 10³ | 9.31 × 10³ |
| Density g/cc | 0.97 | 0.95 |
| Elongation at break, ASTM-D1708-66, % | 787 ± 73 | 658 ± 122 |
| Tensile strength at yield, ASTM-D1708-66, psi | 3.38 ± 0.09 | 3.54 ± 0.13 |
| Ultimate tensile strength, ASTM- | | |

TABLE 1[2] — Continued

| Physical Properties | Graftpolymer Example 1 | Ungrafted Polyethylene |
| --- | --- | --- |
| D1708-66, psi | 4.11 ± 0.31 | 4.31 ± 0.44 |
| Melting point (DSC), °C | 132 | 132 |

[2] The polymers are compression molded into plaques by a Laboratory Press of South Bend Lathe, Inc. The press is pre-heated to a temperature of 450°F. Aluminum frames with 4"× 4"× 0.125 " windows are charged with approximately 25 grams of polymer for each window and pressed for 1 minute at 1,000 p.s.i. The pressure is then increased to 4,500 p.s.i. for 5 minutes. The frame is immediately transferred to a cooling press (Wabash Cooling Press) at 1,500 p.s.i. by trickling water through the press until the mold is at room temperature. The molded polymer plaques are used for tensile test and density measurements.

The percent elongation, the tensile strength at yield in p.s.i. and the ultimate tensile strength in p.s.i. are measured by the standard ASTM-D1708-66 with testing speed at 2 centimeters per minute. Samples are conditioned according to standard ASTM-D618-61.

The glass transition temperature and the melting point of the polymer are determined by the Differential Scanning Calorimeter (Perkin-Elmer Model DSC-1B) using a scanning rate of 20°C per minute.

The apparent viscosity, a processing parameter which includes the property of melt index, is expressed in poise and is obtained by using Instron Rheometer at 190°C. The capillary has the diameter of 0.05" and the length of 2.0".

The density is given in grams per cubic centimeter. A convenient method of measuring the density of the polymer at 23°C is to cut the molded polymers into cubes of various sizes and put the cubes into the flask which contains diluted water at 23°C. 2-propanol is then introduced into the flask and well mixed with water until the cubes are suspended in the mixture for more than thirty minutes. The mixture is volumetrically pipetted out and weighed.

EXAMPLES 2 – 5

The procedure of Example 1 is repeated employing varying amounts of bis(1,1,2,2-tetrahydroperfluoroalkyl) fumarate, and adjusting other variables as shown in Table 2. All graftpolymers have a milky appearance.

TABLE 2

| Example No. | Dicumyl Peroxide % | Shear-temp. °C | Shear-time Min. | $R_f$-fumarate in polyethylene % | Fluorine calc. found % | Graft-Efficiency* % | δ c Dynes cm |
| --- | --- | --- | --- | --- | --- | --- | --- |
| 2 | 0.5 | 160 | 17 | 20 | 12.70/5.13 | 40.4 | 14.0 |
| 3 | 0.5 | 160 | 13 | 9.09 | 5.76/3.87 | 67.0 | 15.4 |
| 4 | 0.25 | 160 | 7.5 | 4.76 | 3.02/3.05 | 100.0 | 15.6 |
| 5 | 0.25 | 160 | 5.5 | 1.00 | 0.61/0.65 | 100.0 | 16.1 |

*Graft efficiencies based on fluorine analysis after acetone extraction as described in Example 1.

EXAMPLE 6

Blending of Grafted High-Density Polyethylene With Ungrafted High-Density Polyethylene One part of polyethylene graftpolymer of Example 4, containing 3.02 percent fluorine is extended with 50 parts of high-density polyethylene (HiFax 4401) by blending in the PlastiCorder at 160°C for 3 minutes. The surface energy (δ C) increases from 15.4 to 17.3 dynes/cm when the fluorine content is reduced from 3.02 to 0.06 percent.

EXAMPLES 7 – 8

40 parts of high-density polyethylene (HiFax 4401) and 2 g of bis(1,1,2,2-tetrahydroperfluoroalkyl) fumarate are blended in the Brabender PlastiCorder for 1 minute and 30 minutes in the absence of a peroxide initiator. The resulting blends are extracted with acetone as described in Example 1 and the fluorine content and free surface energy determined and compared with the graftpolymer of Example 4. The results in Table 3 indicate that grafting occurs in the absence of initiators, however much longer shearing times are required.

TABLE 3

| Ex. No. | Dicumyl Peroxide % | Shear-temp. °C | Shear-time Min. | Fluorine calc. % | Fluorine found % | Graft efficiency % | δ c Dynes cm |
| --- | --- | --- | --- | --- | --- | --- | --- |
| 4 | 0.25 | 160 | 7.5 | 3.02 | 3.05 | 100 | 15.6 |
| 7 | None | 160 | 1.0 | 3.02 | None | 0 | ~31 |
| 8 | None | 160 | 30.0 | 3.02 | 1.19 | 39.6 | 15.6 |

EXAMPLES 9 – 15

Grafting of Different $R_f$-Monomers on High-Density Polyethylene

In each of the following Examples, 40 g of a mixture of high-density polyethylene (HiFax 4401) and the $R_f$-monomers listed in Table 4 are subjected to shearing in the Brabender Plasticorder, at 160°C and a shear rate of 60 RPM employing dicumyl peroxide as initiator. The resulting graftpolymers are extracted with acetone as described in Example 1 and the grafting efficiency determined by fluorine analysis.

TABLE 4

| Example No. | Monomer Structure | Dicumyl peroxide % | Shear-time min. | $R_f$ monomer in blend % | Fluorine content % calc/found | Graft-efficiency % | δ c Dynes cm |
|---|---|---|---|---|---|---|---|
| 9 | $CH_2=C(COOCH_2CH_2R_f)CH_2COOCH_2CH_2R_f$ | 0.5 | 6.0 | 5.0 | 3.20/1.30 | 40 | 16.2 |
| 10 | $[=CHCOOCH_2C_7F_{15}]_2$, trans | 0.5 | 6.0 | 5.0 | 3.24/2.55 | 79 | 15.8 |
| 11 | $[=CHCOOCH_2C_3F_7]_2$, trans | 0.25 | 5.0 | 4.76 | 2.65/2.05 | 78 | 20.7 |
| 12 | $[=CHCOOCH_2C_7F_{15}]_2$, trans | 0.25 | 6.5 | 5.0 | 3.14/2.07 | 66 | 16.0 |
| 13 | $CH_2=$($($ccoocH_2$C_7F_{15})CH_2COOCH_2C_7F_{15}$ | 0.50 | 8.5 | 5.0 | 3.14/1.40 | 44 | 15.9 |
| 14 | $[=CHCOOCH_2CH_2NHCOC_7F_{15}]_2$, trans | 0.5 | 6 | 1.25 | 0.69/0.33 | 48 | 18 |
| 15 | $[CHCONHCH_2C_7F_{15}]_2$, trans | 0.5 | 7 | 5.0 | 3.24/1.50 | 46 | 15.7 |

EXAMPLES 16 – 27

Grafting of Bis(1,1,2,2-Tetrahydroperfluoro-Alkyl) Fumarate on Different Polymeric Graftsites In each of Examples 18 – 19, 40 g of a mixture of the polymeric graftsites indicated in Table 5 and bis(1,1,2,-2-tetrahydroperfluoro-alkyl) fumarate employed in Example 1 are subjected to shearing in the Brabender PlastiCorder at a shear rate of 60 RPM, and variable shear temperatures and shearing times. The resulting graftpolymers are submitted to an acetone or heptane extraction as described in Example 1 to remove ungrafted fumarate monomer. The results listed in Table 5 show that graft efficiencies of 4.5 to 78.8 percent, and δ c-values in the range of 10.4 to 18.4 dynes/cm were obtained.

dried for three minutes at 100°C and tested for oil and water repellency using the standard test method 22-1966 of the American Association of Textile Chemists and Colorists, XXXVII, 1961, p. 1952 (also designated ASTM-D-583-58) and the 3-M-Oil test procedure of Grajek and Peterson, Textile Research Journal, April 1962, p. 323 or by AATCC Standard Test method 18-1966. Very satisfactory ratings are obtained.

As indicated, the graft copolymers of thermoplastic polymers and the particular class of fluoromonomers specified above have drastically lower free surface energies compared to the free surface energies of the ungrafted thermoplastic polymer. It is quite surprising, furthermore, that the very significant reduction in the free surface energy is obtained with relatively very

TABLE 5

| Ex. No. | Graftsites | Initiator % | Shear-time min. | Shear-temp. °C | $R_f$-fumarate monomer in blend % | Fluorine content % calc/found | Graft-efficiency % | δ c of graft dynes/cm | δ c of graftsite dynes/cm |
|---|---|---|---|---|---|---|---|---|---|
| 16 | Polyethylene ALETHON 7030 DuPont | 0.5* | 6.5 | 150 | 5.0 | 3.18/2.51 | 78.8 | 16 | 31 |
| 17 | Ethylene-vinyl acetate copolymer | 0.25* | 7 | 150 | 5.0 | 3.18/1.40 | 44.0 | 14.6 | >31 |
| 18 | EPT-Rubber NORDEL 1040 DuPont | 0.5* | 15 | 100 | 5.0 | 3.18/1.55 | 49.0 | 15.3 | >24 |
| 19 | Polypropylene PROFAX 6501 Hercules | 0.25** | 7.5 | 175 | 2.0 | 1.28/0.35 | 27.7 | 15.7 | >24 |
| 20 | Polyvinyl chloride W-200-1108 Pentasott Corp. | 0.2** | 7.5 | 160 | 2.0 | 1.28/0.045 | 3.5 | 18.0 | 39 |
| 21 | Polystyrene STYRON 456 Dow | 0.25* | 6 | 150 | 5.0 | 3.18/0.21 | 6.6 | 15.0 | 33 |
| 22 | ABS-Rubber CYCOLAC TD-1001 Marbon Chemicals | 0.20* | 6 | 175 | 2.0 | 3.18/2.30 | 7.2 | 13.9 (crude) | >33 |
| 23 | Butadiene-acrylonitrile copolymer HYCAR 1022 Goodrich | 0.5* | 5.5 | 100 | 5.0 | 3.18/0.64 | 20.1 | 13.9 | 33 |
| 24 | Polyester VITEL VMF 400 Goodyear | 0.5* | 6 | 160 | 5.0 | 3.18/0.59 | 18.7 | 10.4 | 43 |
| 25 | Polyamide Zytel-42-NC-10 DuPont | none | 5 | 290 | 5.0 | 3.18/2.48 | 78.3 | 15.0 | 46 |
| 26 | Polycarbonate LEXAN 145 DuPont | 0.5* | 7 | 230 | 5.0 | 3.18/2.50 | 78.5 | 17.0 | 35 |
| 27 | Polyvinyl alcohol | 0.5* | 3.5 | 225 | 5.0 | 3.18/0.89 | 28 | 18.4 | — |

*Dicumyl peroxide
**VULCUP - a bis(t-butyl peroxy)-diisopropyl) benzene - Hercules, Inc.

EXAMPLE 28

A graft copolymer of Example 18 is dissolved in mineral spirits to form a 5 percent solution. The solution is then diluted with 1,1,1-trichloroethane and the solution applied to cotton fabric to give a fluorine level of 0.08 percent by weight on the fabric. The fabric is then minor amounts of the fluoromonomer being grafted to the thermoplastic polymer. Significant reductions are obtained with as little as 0.05 percent by weight of fluoromonomer grafted to the thermoplastic polymer.

One of the principal advantages of the normally solid graft copolymers of this invention, therefore, is that the reduction in free surface energy is obtained with very minor amounts of the grafted monomer, and thus the other solid properties of the grafted copolymer are very similar to those of the ungrafted polymer with the exception of the free surface energy. Thus, for example, a polyethylene graft copolymer containing 0.50 to 2 percent by weight of the grafted fluoromonomer will have essentially the same solid state properties as ungrafted polyethylene with the exception that the free surface energy has dropped from 31 to somewhere in the area of 10 to 15 dynes/cm.

The performance of such existing fluoro textile finishes as soil repellents in regard to their fastness to abrasion, washing and dry-cleaning has not been completely satisfactory, particularly in applications to carpeting, where abrasion is a very significant factor. Such carpet finishes, therefore, have been of marginal commercial value. By utilizing the graft copolymers of the present invention as textile fibers, the apparent fastness properties, especially those of abrasion resistance, are vastly improved, since the fluoro polymer finish is in actuality an integral part of the polymer utilized in the textile fiber.

The graft copolymers obtained according to the present invention may also be utilized in certain plastic biomedical devices. For example, it is known that polymers with low free surface energies induce blood clotting to a much lesser degree than polymers having a high free surface energy. Thus the graft copolymers of the present invention when substituted in biomedical devices for ungrafted polymers will yield improved performance with regard to blood clotting, without significantly changing the other solid state properties of the device.

The new fluoro graft copolymers of the present invention find general application where polymers having low free surface energy properties are desirable. For example, those applications where polymers of tetrafluoroethylene are now commonly employed are typical applications of a grafted copolymer according to the present invention wherein the backbone polymer is polyethylene.

The graft copolymers of the present invention find uses in electromagnetic tapes in order to help reduce heat buildup on tape heads and to help reduce the wear of tape heads, and as non-stick finishes or coatings on slides for freezer drawers, snow shovels, tools, ski surfaces, and the like. They may be employed as additives to other thermoplastic polymers and thermosetting resins to increase resistance to wear and abrasion due to the reduced coefficient of friction.

What is claimed is:

1. A graft copolymer of a polyolefin selected from the group consisting of polyethylene and polypropylene with 0.01 to 10 percent by weight of the polyolefin of a compound of the formula:

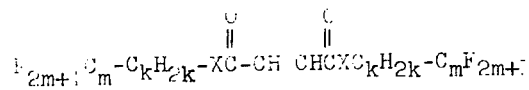

wherein $m$ is a whole number of 3 to 14, $k$ is a whole number of 0 to 10, and X is oxygen or sulfur.

2. The graft copolymer of claim 1 wherein $k$ is 2 and X and 0.

3. The graft copolymer of claim 2 wherein the polyolefin is polyethylene.

* * * * *